United States Patent
Bramley, Jr. et al.

(10) Patent No.: US 10,747,873 B2
(45) Date of Patent: Aug. 18, 2020

(54) SYSTEM MANAGEMENT MODE PRIVILEGE ARCHITECTURE

(71) Applicant: HEWLETT-PACKARD DEVELOPMENT COMPANY, L.P., Houston, TX (US)

(72) Inventors: Richard A. Bramley, Jr., Mansfield, MA (US); David Plaquin, Bristol (GB); Maugan Villatel, Bristol (GB); Jeffrey K. Jeansonne, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 35 days.

(21) Appl. No.: 15/747,983

(22) PCT Filed: Jan. 26, 2016

(86) PCT No.: PCT/US2016/014908
§ 371 (c)(1),
(2) Date: Jan. 26, 2018

(87) PCT Pub. No.: WO2017/131635
PCT Pub. Date: Aug. 3, 2017

(65) Prior Publication Data
US 2018/0322277 A1    Nov. 8, 2018

(51) Int. Cl.
*G06F 21/53* (2013.01)
*G06F 21/55* (2013.01)
(Continued)

(52) U.S. Cl.
CPC ............. *G06F 21/53* (2013.01); *G06F 21/57* (2013.01); *G06F 21/577* (2013.01);
(Continued)

(58) Field of Classification Search
CPC ........ G06F 21/53; G06F 21/57; G06F 21/577; G06F 21/62; G06F 21/556;
(Continued)

(56) References Cited

U.S. PATENT DOCUMENTS 7,480,797 B2 * 1/2009 McKee ................. G06F 21/556
                                                          712/220
7,496,966 B1    2/2009 McGrath
(Continued)

FOREIGN PATENT DOCUMENTS

JP    2007265434 A  * 10/2007 ............. G06F 21/22
WO    WO-2014043884 A1    3/2014

OTHER PUBLICATIONS

Duflot; "Using CPU System Management Mode to Circumvent Operating System Security Functions"; http://fawlty.cs.usfca.edu/~cruse/cs630f06.duflot.pdf.

*Primary Examiner* — Jeffrey C Pwu
*Assistant Examiner* — Ali H. Cheema
(74) *Attorney, Agent, or Firm* — HPI Patent Department

(57) ABSTRACT

In one example, a system for a system management mode (SMM) privilege architecture includes a computing device comprising: a first portion of SMM instructions to set up a number of resources and implement a privilege architecture for the SMM of a computing device and a second portion of SMM instructions to execute a number of functions during the SMM of the computing device, wherein the privilege architecture assigns the first portion of SMM instructions to a first privilege level and assigns the second portion of SMM instructions to a second privilege level.

19 Claims, 3 Drawing Sheets

(51) Int. Cl.
*G06F 21/57* (2013.01)
*G06F 21/62* (2013.01)
*G06F 21/74* (2013.01)

(52) U.S. Cl.
CPC ........ *G06F 21/629* (2013.01); *G06F 21/6218* (2013.01); *G06F 21/74* (2013.01); *G06F 2221/2141* (2013.01); *G06F 2221/2149* (2013.01)

(58) Field of Classification Search
CPC .... G06F 21/6218; G06F 21/629; G06F 21/74; G06F 2221/21; G06F 2221/2141; G06F 2221/2149; G06F 9/4812; G06F 21/22; G06F 15/16; G06F 11/0745; G06F 11/0772; G06F 11/2215; H04L 63/20
USPC ............. 726/1, 2; 713/2, 164; 712/220, 244; 710/260, 269, 267; 709/228, 208
See application file for complete search history.

(56) References Cited

U.S. PATENT DOCUMENTS

| | | | |
|---|---|---|---|
| 8,973,158 | B2 | 3/2015 | Abraham et al. |
| 9,177,153 | B1* | 11/2015 | Perrig ..................... G06F 21/57 |
| 2003/0229794 | A1 | 12/2003 | Sutton, II et al. |
| 2004/0221271 | A1 | 11/2004 | Zeman et al. |
| 2005/0114578 | A1* | 5/2005 | Lewis ................... G06F 21/577 710/260 |
| 2005/0114687 | A1 | 5/2005 | Zimmer |
| 2006/0224685 | A1* | 10/2006 | Begun ..................... G06F 15/16 709/208 |
| 2007/0011500 | A1* | 1/2007 | Dasari ................ G06F 11/0745 714/100 |
| 2007/0239875 | A1* | 10/2007 | Sood ....................... H04L 63/20 709/228 |
| 2009/0119748 | A1* | 5/2009 | Yao ..................... G06F 9/45558 726/2 |
| 2009/0125716 | A1* | 5/2009 | Wooten ................... G06F 21/57 713/164 |
| 2010/0262743 | A1* | 10/2010 | Zimmer ................ G06F 9/4812 710/267 |
| 2011/0078408 | A1* | 3/2011 | Ishida ................... G06F 21/572 711/216 |
| 2012/0216242 | A1 | 8/2012 | Uner et al. |
| 2012/0297177 | A1* | 11/2012 | Ghosh ..................... G06F 21/53 713/2 |
| 2013/0160133 | A1 | 6/2013 | Avgerinos et al. |
| 2014/0281092 | A1* | 9/2014 | Jayakumar .......... G06F 11/0772 710/269 |
| 2015/0143089 | A1* | 5/2015 | Lewis ................... G06F 9/4812 712/244 |
| 2015/0227385 | A1 | 8/2015 | Martinez et al. |
| 2017/0132102 | A1* | 5/2017 | Hirano ................ G06F 11/2215 |

* cited by examiner

SYSTEM MANAGEMENT MODE PRIVILEGE ARCHITECTURE

BACKGROUND

A computing system can include instructions to perform various system management mode (SMM) functions of the computing system. The instructions can be executed by a processor when an event occurs that invokes the SMM. SMM instructions can be the subject of attacks by malware in the computing system or from an external service. As a result of an attack, the SMM instructions can become compromised.

DETAILED DESCRIPTION

Figure 1:
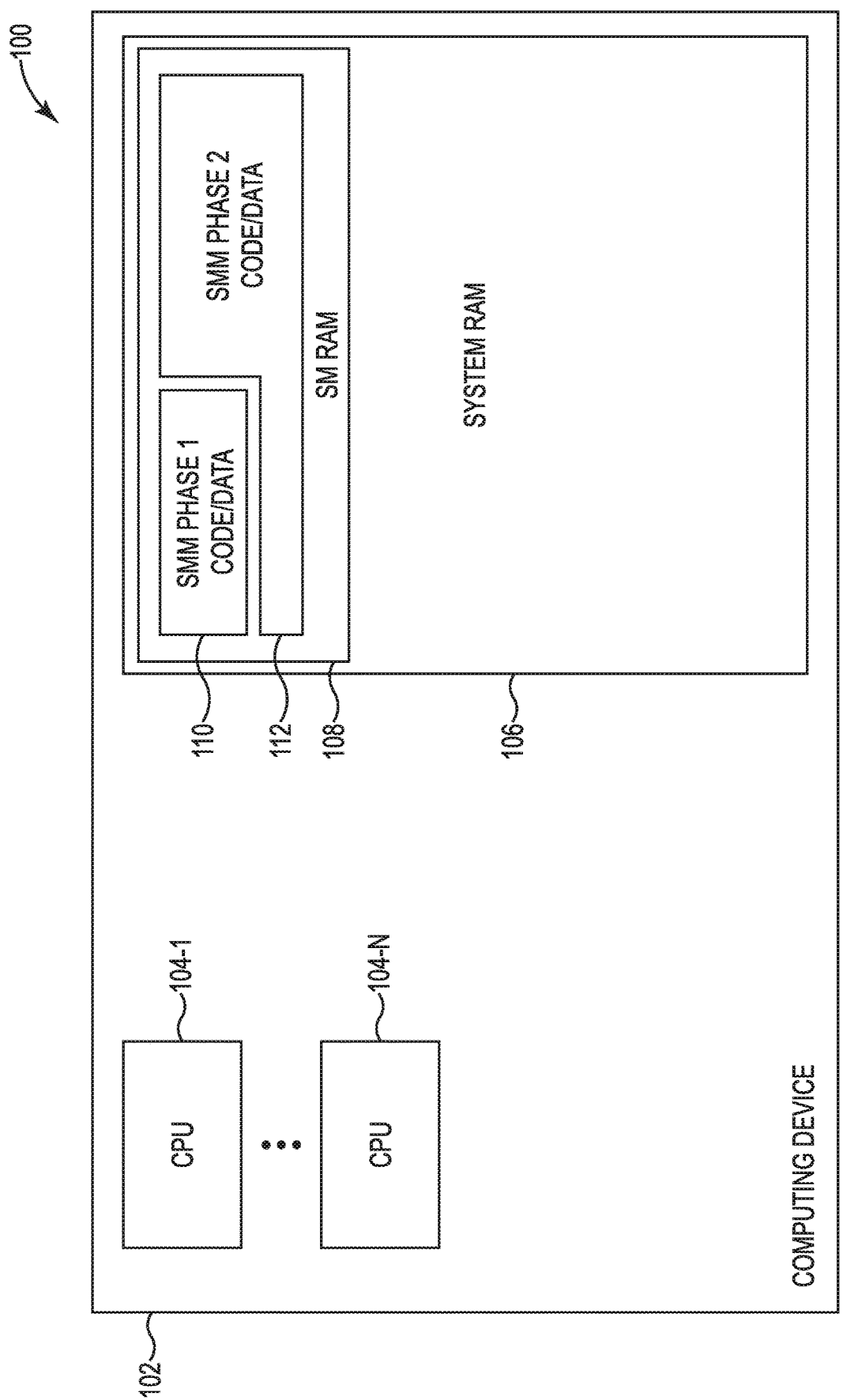
FIG. 1 illustrates a diagram of an example of a system for a system management mode privilege architecture consistent with the present disclosure.

A number of examples for a system management mode (SMM) privilege architecture are described herein. In one example, a system for a system management mode privilege architecture includes a computing device comprising: a first portion of SMM instructions to set up a number of resources and implement a privilege architecture for the SMM of a computing device and a second portion of SMM instructions to execute a number of functions during the SMM of the computing device, wherein the privilege architecture assigns the first portion of SMM instructions to a higher privilege level and assigns the second portion of SMM instructions to a lower privilege level.

In some examples, the SMM privilege architecture can protect computer processor unit (CPU) resources and memory resources from malicious activity. For example, the SMM privilege architecture can protect: control registers, debug registers global descriptor tables, interrupt descriptor tables, MSRs, and/or a configuration of the paging subsystem within the SMM environment, among other resources. In some examples, the SMM privilege architecture can protect against SMM instruction compromise and/or provide enforcement of security policies for usage of specific security critical resources. In some examples, the security critical resources can include, but are not limited to: secrets, page tables, control registers, debug registers, MSRs, GDT, IDT, I/O ports, MMIO areas, among other resources.

In some examples, the resources can be protected by isolating the resources from potentially malicious instructions by implementing the SMM privilege architecture. For example, a first portion of SMM instructions can implement a privilege architecture that includes a number of privilege layers (e.g., privilege rings, privilege levels, etc.). In some examples, the number of privilege layers can be utilized to prevent a second portion of SMM instructions from accessing or utilizing resources without being verified by the first portion of SMM instructions.

In some examples, the first portion of SMM instructions can be implement a SMM privilege architecture where the first portion of SMM instructions are defined as a higher privilege level compared to the second portion of SMM instructions. That is, the first portion of SMM instructions can have greater access to resources compared to the second portion of SMM instructions. In one example, the first portion of SMM instructions can be executed upon starting a SMM of a computing device. In this example, the first portion of SMM instructions can implement a setup and configuration of security critical resources as well as monitoring and handling security policy violations by instructions that are within a lower privilege level (e.g., second portion of SMM instructions, instructions that have less access to resources, less privileges compared to a higher privilege level, etc.). In this example, the functions of the SMM can be implemented by the second portion of the SMM instructions while the first portion of SMM instructions monitor and provide access to the second portion of SMM instructions.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense FIG. 1 illustrates a diagram of an example of a system 100 for a system management mode (SMM) privilege architecture consistent with the present disclosure. In some examples, the system 100 can include a computing device 102. In some examples, the computing device 102 can include a number of processing resources 104-1, 104-N (e.g., CPU, processor, processing device, logic, etc.).

In some examples, the number of processing resources 104-1, 104-N can be utilized to execute instructions within a memory resource (e.g., non-transitory computer readable memory, random access memory (RAM), system management memory (SMRAM, etc.). In some examples, the computing device 102 can include system RAM 106. In some examples, the system RAM 106 can be utilized to store data and/or instructions for the computing device 102. For example, the system RAM 106 can be utilized to store data associated with an operating system (OS) of the computing device 102.

The system RAM 106 can include SMRAM 108. The SMRAM 108 can be utilized to store instructions and data utilized in the SMM as described herein. In some examples, the SMRAM 108 is only accessible when the computing device is running the SMM. In some examples, the SMRAM can be utilized to store SMM instructions and/or SMM data for implementing a SMM operation. In some examples, the SMM instructions can be split into a first portion of SMM instructions 110 and a second portion of SMM instructions 112. As described herein, the first portion of SMM instructions 110 can be isolated from the second portion of SMM instructions 112. That is, the first portion of the SMM instructions 110 can be stored separately from the second portion of the SMM instructions 112.

In some examples the first portion of SMM instructions 110 can be utilized to set up and/or initialize a SMM operation. For example, a system management interrupt (SMI) can occur and the number of processing resources 104-1, 104-N can enter a SMM and begin to execute the first portion of SMM instructions 110. In this example, the first portion of SMM instructions 110 can be executed by the number of processing resources 104-1, 104-N to set up resources such as security critical resources. In this example, the first portion of Si instructions 110 can be executed to implement a SMM privilege architecture to be utilized by the second portion of SMM instructions 112.

In some examples, the first portion of SMM instructions 110 can configure a page table of the computing device 102 and implement policies to be utilized by the second portion of SMM instructions 112. In some examples, the first portion of SMM instructions 110 can configure SMM secrets into pages that are unavailable to the second portion of SMM instructions 112. In some examples the first portion of SMM instructions 110 can define instructions and/or data that will be protected from the second portion of SMM instructions 112. In some examples, the first portion of SMM instructions can enable paging utilizing the configured page table (e.g., page table configured by the first portion of SMM instructions 110, etc.).

In some examples, the first portion of SMM instructions 110 can configure I/O access rights for the second portion of SMM instructions 112. In some examples, the first portion of SMM instructions 110 can install an exception handlers to detect and/or monitor security policy violations (e.g., violations defined by the first portion of SMM instructions 110, etc.).

In some examples, the first portion of SMM instructions 110 can expose or generate a service interface for the second portion of SMM instruction 112. In some examples, the service interface can be utilized by the second portion of SMM instructions 112 to request resources and/or data from the first portion of SMM instructions 110. In some examples, the service interface can include a verification procedure to confirm that the second portion of SMM instructions 112 is verified to access the requested resources and/or data from the first portion of SMM instructions 110. In some examples, the first portion of SMM instructions 110 can utilize privilege level checking. In some examples the first portion of SMM instructions 110 can utilize privilege level checking in addition or instead of page tables to protect resources and/or data.

In some examples, the first portion of SMM instructions 110 can determine when the SMM privilege architecture is complete. When the SMM privilege architecture is complete the first portion of SMM instructions 110 can transition the SMM to a lower (e.g., more restrictive, less privileges, etc.) privilege mode. In some examples, the lower privilege mode can utilize the second portion of SMM instructions 112. In some examples, the second portion of SMM instructions 112 can be utilized to perform a number of functions within the SMM. In some examples, an exception handler of the first portion of SMM instructions 110 can be utilized to monitor the functions performed by the second portion of SMM instructions 112. In some examples, the exception handler of the first portion of SMM instructions 110 can perform a number of functions when a policy violation has occurred during execution of the second portion of SMM instructions 112.

In some examples, the exception handler can determine a policy violation and identify a source of the security policy violations. For example, the exception handler can report the policy violation to a trusted device (e.g., first portion of instructions 110, etc.). In another example, the exception handler can allow the policy violation to occur and carry on executing the second portion of SMM instructions 112 in a lower privilege mode. In another example, the exception handler can prevent the policy violation from occurring and carry on executing the second portion of SMM instructions 112 in a lower privilege mode. In some examples, prevent-ing the policy violation from occurring can include skipping the instruction generating the policy violation, essentially turning the instruction into a no operation (NOP). In some examples, the exception handler can terminate the processing of the SMI and report an error to the entity which issued the SMI. In some examples, the exception handler can roll back to a known state that does not include a policy violation and terminate the processing of the SMI.

As described herein, the second portion of SMM instructions 112 can utilize a service interface to access resources from the first portion of SMM instructions 110. In some examples, the second portion of SMM instructions 112 can request usage of a protected resource (e.g., utilizing a secret to perform a cryptographic operation, etc.). The first portion of SMM instructions 110 can validate the request of the second portion of SMM instructions 112 in accordance with a number of defined security policies. As described herein, the security policies can be defined by the first portion of SMM instructions 110. In some examples, the first portion of SMM instructions 110 can execute the operation requested by the second portion of SMM instructions 112. In these examples, the first portion of SMM instructions can provide the results of the executed operation to the second portion of SMM instructions 112.

In some examples, the SMM of the computing device 102 can be exited to a normal operation. In some examples, the second portion of SMM instructions 112 can end execution. In some examples, when the second portion of SMM instructions 112 ends execution, the first portion of SMM instructions 110 can check a value of dynamic data to determine if the dynamic data is consistent with a predetermined value set by the number of security policies. In addition, the first portion of SMM instructions 110 can check a hardware configuration register of the computing device 102 to determine if the hardware configuration register is consistent with predetermined configurations set by the number of security policies.

Figure 2:
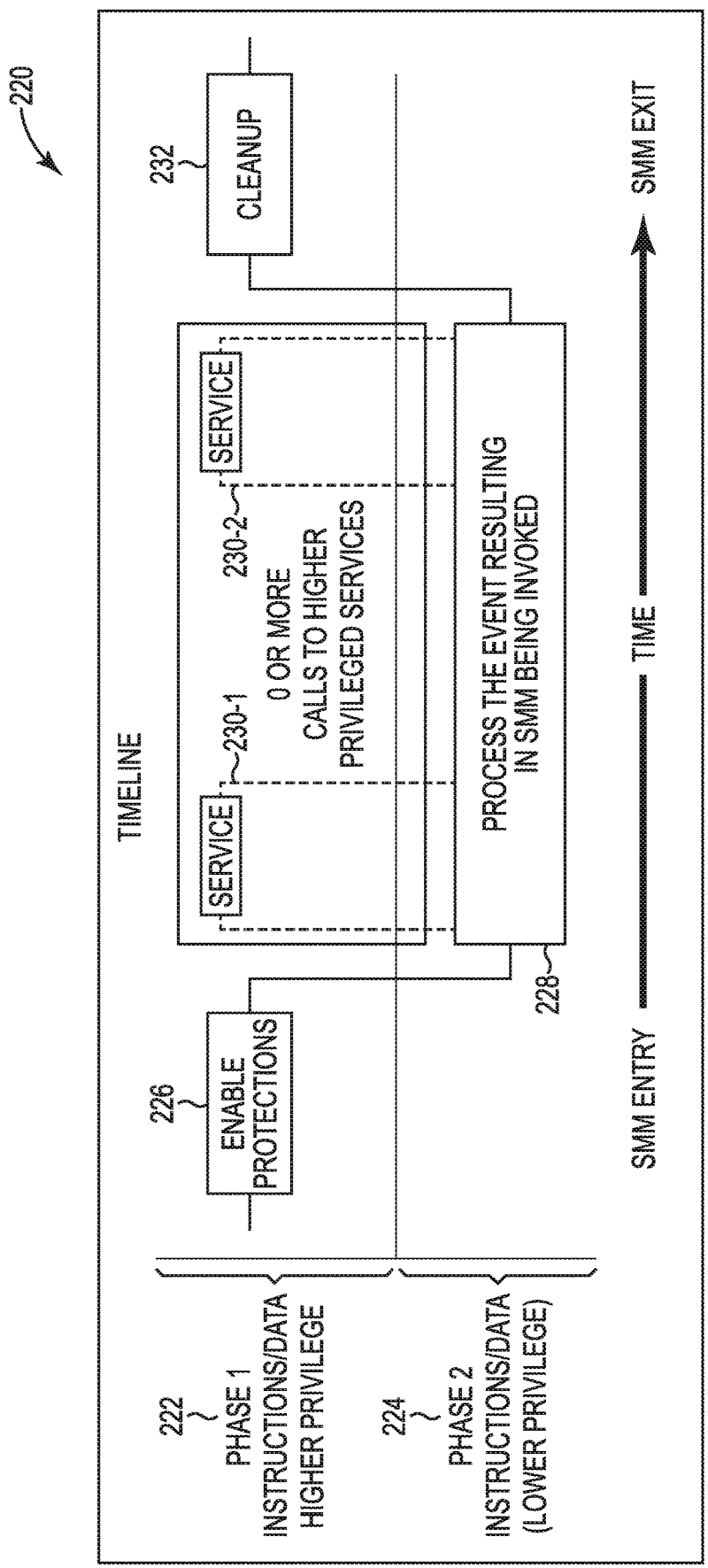
FIG. 2 illustrates a diagram of an example of a system for a system management mode privilege architecture consistent with the present disclosure.

FIG. 2 illustrates a diagram of an example of a system 220 for a system management mode (SMM) privilege architecture consistent with the present disclosure. In some examples, the system 220 can represent a timeline of a SMM operation where the SMM operation starts at a left side of the system 220 and ends at a right side of the system 220. As described herein, SMM instructions stored in SMRAM can be split into a first portion of SMM instructions 222 (e.g., phase 1 instructions/data, higher privilege instructions, etc.) and a second portion of SMM instructions 224 (e.g., phase 2 instructions/data, lower privilege instructions.

In some examples, the SMM operation can be initiated by a SMI. In some examples, the SMM operation can begin with the first portion of SMM instructions 222 enabling protections 226. As described herein, enabling protections 226 can include setting up and/or initializing a SMM operation. For example, a system management interrupt (SMI) can occur and number of processing resources can enter a SMM and begin to execute the first portion of SMM instructions. As described herein, enabling protections 226 can include configuring a SMM privilege architecture for the second portion of instructions 224. When the SMM privilege architecture and enabling protections 226 is complete, the first portion of SMM instructions 222 can move the SMM operation to a lower privilege level (e.g., second portion of SMM instructions 224, etc.).

As described herein the second portion of instructions can perform a number of functions in the SMM operation. For example, the second portion of SMM instructions 224 can process the event resulting in SMM being invoked 228 (e.g., a SMI has occurred, etc.). As described herein, the second portion of SMM instructions 224 can utilize a service interface to make one or more calls 230-1, 230-2 (e.g., request for resources, etc.) to the first portion of SMM instructions 222 that utilize privileged resources. For example, the SMM privilege architecture implemented by the first portion of SMM instructions 222 at enable protections 226 can identify particular resources to be accessed only by the first portion of SMM instructions 222 or higher privilege level instructions (e.g., more privileges, less restrictions, etc.). In some examples, the second portion of SMM instructions 224 can request a service 230-1, 230-2 that is outside the privilege architecture defined for the second portion of SMM instructions 224 from the first portion of SMM instructions 222.

As described herein, the SMM mode can enter a cleanup 232 upon completion of the processing the event resulting in SMM being invoked 228. In some examples, the cleanup 232 can be executed by the first portion of SMM instructions 222. In some examples, the cleanup 232 can include the first portion of SMM instructions 222 can check a value of dynamic data to determine if the dynamic data is consistent with a predetermined value set by the number of security policies.

Figure 3:
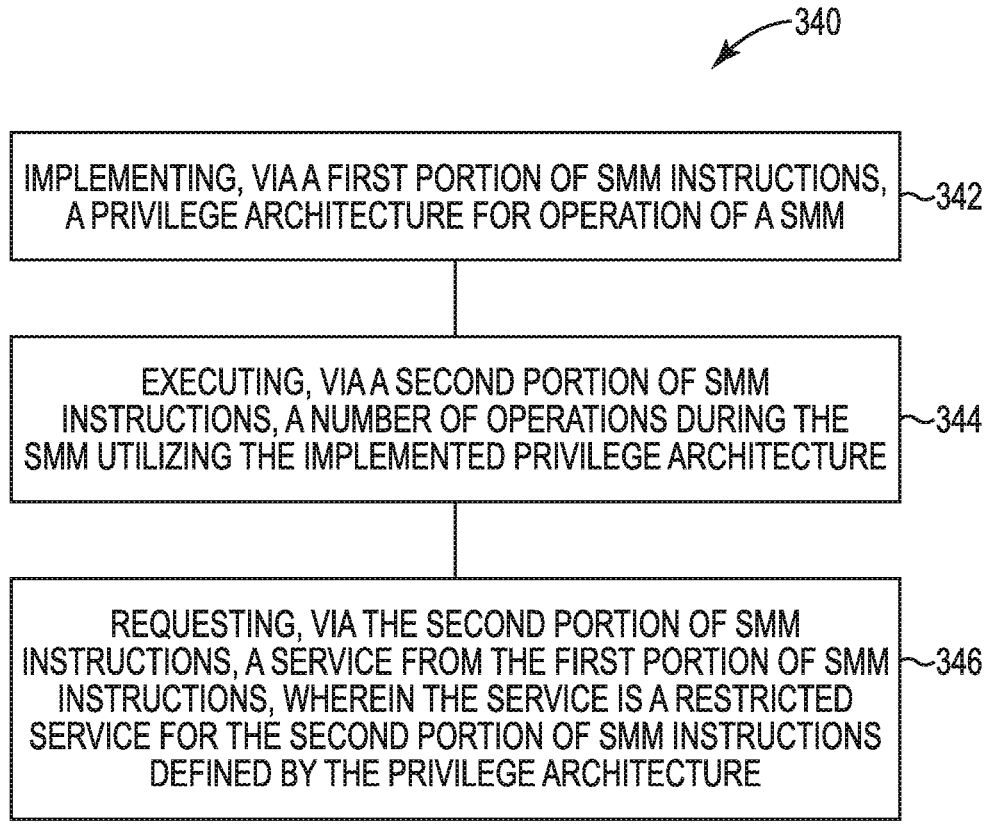
FIG. 3 illustrates a diagram of an example of a method for a system management mode privilege architecture consistent with the present disclosure.

FIG. 3 illustrates a diagram of an example of a method 340 for a system management mode privilege architecture consistent with the present disclosure. In some examples, the method 340 can be executed by a number of SMM instructions stored in a SMRAM as described herein. In some examples, the SMM instructions stored in SMRAM can be executed by a processing resource as described herein.

At 342, the method 340 can include implementing, via a first portion of SMM instructions, a privilege architecture for operation of a SMM. As described herein, implementing a privilege architecture for operation of a SMM can include determining data that a second portion of SMM instructions is able to access at a lower privilege level. That is, implementing the privilege architecture can include defining a number of privilege levels. In some examples, each of the number of privilege levels can have particular access to different resources. In some examples, the privilege architecture can be defined and implemented by the first portion of SMM instructions for utilization by a second portion of SMM instructions during the SMM operation. In some examples, the method 340 can include assigning data, via the first portion of SMM instructions, to a first privilege level that is higher (e.g., more privileges, less restrictive, etc.) than a second privilege level assigned to the second portion of SMM instructions.

At 344, the method 340 can include executing, via a second portion of SMM instructions, a number of operations during the SMM utilizing the implemented privilege architecture. As described herein, the second portion of SMM instructions can be utilized to process an event resulting in the SMM being invoked. In some examples, the second portion of SMM instructions can utilize a service interface to access resources that are not within the privilege level of the second portion of SMM instructions. In some examples the service interface can be utilized by the first portion of SMM instructions to validate the second portion of SMM instructions.

At 346, the method 340 can include requesting, via the second portion of SMM instructions, a service from the first portion of SMM instructions, wherein the service is a restricted service for the second portion of SMM instructions defined by the privilege architecture. As described herein, the second portion of SMM instructions can utilize the service interface to request the service from the first portion of SMM instructions. For example, the second portion of SMM instructions can utilize a restricted service while processing the event resulting in SMM being invoked. In this example, the second portion of SMM instructions can be verified by the first portion of SMM instructions via the service interface.

In some examples, the first portion of SMM instructions can receive the request from the second portion of SMM instructions. In these examples, the first portion of SMM instructions can perform the service or access the resource without utilizing the second portion of SMM instructions. In these examples, the first portion of instructions can provide the resource information to the second portion of SMM instructions.

As described herein, the privilege architecture can provide separation and isolation between the first portion of SMM instructions and the second portion of SMM instructions. In some examples, the privilege architecture can protect critical resources from malicious or untrusted SMM instructions.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for a system management mode (SMM) privilege architecture, comprising:
   a computing device comprising:
      a first portion of SMM instructions to set up a number of resources and implement a privilege architecture for an SMM of the computing device; and
      a second portion of SMM instructions to execute a number of functions during the SMM of the computing device,
      wherein:
         the privilege architecture assigns the first portion of SMM instructions to a first privilege level and assigns the second portion of SMM instructions to a second privilege level;
         the second portion of SMM instructions requests a service from the first portion of SMM instructions that is outside the privilege architecture defined for the second portion of SMM instructions from the first portion of SMM instructions; and
         the first portion of SMM instructions executes the service requested by the second portion of SMM instructions and monitors the number of functions performed by the second portion of SMM instructions.

2. The system of claim 1, wherein the privilege architecture defines the first privilege level as a less restricted privilege level than the second privilege level.

3. The system of claim 1, wherein the first portion of SMM instructions verifies data associated with the second portion of SMM instructions upon receiving the requested service.

4. The system of claim 1, wherein:
the first portion of SMM instructions:
determines when the SMM privilege architecture is complete; and
transitions the SMM to a lower privilege level; and
the second portion of SMM instructions is executable only after the first portion of SMM instructions implements the lower privilege level.

5. The system of claim 1, wherein the first portion of SMM instructions exposes a service interface that is called by the second portion of SMM instructions and through which the second portion of SMM instructions requests resources and data from the first portion of SMM instructions.

6. The system of claim 1, wherein the first portion of SMM instructions monitors security policy violations via an exception handler and identifies a source of the security policy violations.

7. The system of claim 6, wherein the exception handler:
rolls back to a state that does not include a policy violation; and
terminates a processing of a system management interrupt (SMI).

8. The system of claim 7, wherein the exception handler reports an error to an entity that issued the SMI.

9. The system of claim 1, wherein the second portion of SMM instructions implements operations of the SMM while the first portion of SMM instructions monitors and provides access to the second portion of SMM instructions.

10. The system of claim 1, wherein the first portion of SMM instructions implements policies to be utilized by the second portion of SMM instructions.

11. The system of claim 1, wherein the privilege architecture defines access of the second portion of SMM instructions to each of a control register, a debug register, a global descriptor table, an interrupt descriptor table, an MSR, and a configuration of a paging subsystem within an SMM environment.

12. A non-transitory computer readable medium for a system management mode (SMM) privilege architecture, comprising:
a first portion of SMM instructions to implement, upon entering an SMM for a computing device, a privilege architecture for an operation of the SMM; and
a second portion of SMM instructions to execute a number of functions during the operation of the SMM based on the privilege architecture,
wherein:
the second portion of SMM instructions requests a service from the first portion of SMM instructions that is outside the privilege architecture defined for the second portion of SMM instructions from the first portion of SMM instructions; and
the first portion of SMM instructions executes the service requested by the second portion of SMM instructions and monitors the number of functions performed by the second portion of SMM instructions.

13. The non-transitory computer readable medium of claim 12, wherein the first portion of the SMM instructions limits a functionality of the second portion of the SMM instructions when the privilege architecture is implemented.

14. The non-transitory computer readable medium of claim 12, wherein the first portion of the SMM instructions is stored at a different address than the second portion of the SMM instructions.

15. The non-transitory computer readable medium of claim 12, wherein the second portion of the SMM instructions is not executed prior to the first portion of SMM instructions implementing the privilege architecture.

16. A method for a system management mode (SMM) privilege architecture, comprising:
splitting SMM instructions into a first portion of SMM instructions and a second portion of SMM instructions;
upon entering an SMM via triggering of a system management interrupt (SMI):
implementing, via the first portion of SMM instructions, a privilege architecture for an operation of the SMM;
upon completion of the privilege architecture:
transitioning, via the first portion of SMM instructions, the SMM to a lower privilege mode;
executing, via the second portion of SMM instructions, a number of functions during the operation of the SMM utilizing the implemented privilege architecture;
requesting, via the second portion of SMM instructions, a service from the first portion of SMM instructions, wherein the service is a restricted service for the second portion of SMM instructions defined by the privilege architecture;
executing, via the first portion of SMM instructions, the service requested by the second portion of SMM instructions; and
monitoring, via the first portion of SMM instructions, the number of functions performed by the second portion of SMM instructions; and
upon completion of processing an event resulting in the SMM being invoked, executing, via the first portion of SMM instructions, a cleanup by checking a value of dynamic data to determine whether the dynamic data is consistent with a predetermined value.

17. The method of claim 16, comprising enabling protections, via the first portion of SMM instructions, for the SMM of a computing device.

18. The method of claim 16, comprising assigning data, via the first portion of SMM instructions, to a first restricted privilege level.

19. The method of claim 18, comprising assigning the second portion of SMM instructions to a second restricted privilege level.

* * * * *